US012638052B2

(12) United States Patent
Restivo et al.

(10) Patent No.: US 12,638,052 B2
(45) Date of Patent: May 26, 2026

(54) BEARING UNIT WITH RETAINING CAGE

(71) Applicant: Aktiebolaget SKF, Gothenburg (SE)

(72) Inventors: Riccardo Restivo, Turin (IT); Piero Santangelo, Turin (IT); Gianpiero Scaltriti, Turin (IT); Nils Manne, Gothenburg (SE)

(73) Assignee: Aktibolaget SKF, Gothenburg (SE)

( * ) Notice: Subject to any disclaimer, the term of this patent is extended or adjusted under 35 U.S.C. 154(b) by 29 days.

(21) Appl. No.: 18/654,523

(22) Filed: May 3, 2024

(65) Prior Publication Data

US 2024/0384758 A1     Nov. 21, 2024

(30) Foreign Application Priority Data

May 16, 2023     (IT) ......................... 102023000009876

(51) Int. Cl.
| | |
|---|---|
| *F16C 19/06* | (2006.01) |
| *F16C 33/38* | (2006.01) |
| *F16C 33/41* | (2006.01) |

(52) U.S. Cl.
CPC .......... *F16C 33/3887* (2013.01); *F16C 19/06* (2013.01); *F16C 33/416* (2013.01); *F16C 33/418* (2013.01); *F16C 2220/04* (2013.01); *F16C 2240/30* (2013.01); *F16C 2240/60* (2013.01); *F16C 2240/70* (2013.01)

(58) Field of Classification Search
CPC ...... F16C 19/06; F16C 33/3887; F16C 33/41; F16C 33/412; F16C 33/416; F16C 33/418; F16C 2208/04; F16C 2220/04; F16C 2240/30; F16C 2240/60; F16C 2240/70
See application file for complete search history.

(56) References Cited

U.S. PATENT DOCUMENTS

| | | | | |
|---|---|---|---|---|
| 5,642,945 A | * | 7/1997 | Abe ...................... | F16C 33/418 |
| | | | | 384/470 |
| 6,074,099 A | * | 6/2000 | Mutou ................ | F16C 33/6681 |
| | | | | 384/531 |
| 6,276,836 B1 | * | 8/2001 | Suzuki ................ | F16C 33/6629 |
| | | | | 384/531 |
| 2014/0112608 A1 | | 4/2014 | Ito et al. | |
| 2017/0108043 A1 | * | 4/2017 | Mocnik .............. | F16C 33/3875 |

FOREIGN PATENT DOCUMENTS

| | | |
|---|---|---|
| CN | 104937293 A | 9/2015 |
| JP | H11166540 A | 6/1999 |
| JP | 2016180436 A | 10/2016 |

OTHER PUBLICATIONS

Examination Report of the National Intellectual Property Office of Italy in Application No. 102023000009876, dated Dec. 13, 2023; 10pgs.

* cited by examiner

*Primary Examiner* — Phillip A Johnson
(74) *Attorney, Agent, or Firm* — Stinson LLP

(57) ABSTRACT

Bearing unit (30) has a central axis of rotation (X) and a retaining cage (40) for a plurality of rolling bodies (34) interposed between a radially outer ring (31) and a radially inner ring (33). The retaining cage (40) has a base rib (41), a plurality of tenons (42) that are spaced apart circumferentially and rigidly connected to the rib (41), and a plurality of pockets (43). Each pocket (43) is delimited by the rib (41) and by a respective pair of adjacent tenons (42). Each pocket (43) is defined by a respective radially outer spherical surface (44) and by at least one respective radially inner cylindrical surface (45) radially adjacent to the spherical surface (44).

15 Claims, 4 Drawing Sheets

BEARING UNIT WITH RETAINING CAGE

CROSS-REFERENCE TO RELATED APPLICATION

This application claims priority to Italian Application No. 102023000009876, filed May 16, 2023, the entirety of which is hereby incorporated by reference.

FIELD

The present disclosure relates to a bearing unit with a retaining cage.

BACKGROUND

Bearing units incorporating a retaining cage of a known type have a retaining cage for a plurality of rolling bodies, or balls, interposed between a radially outer ring and a radially inner ring to enable the relative rotation between the two rings, and to hold the rolling bodies in the respective circumferential positions.

The retaining cages of the bearing units of a known type comprise a circular base rib and a plurality of tenons, which are spaced apart circumferentially and define in pairs a plurality of pockets to hold respective balls.

The base rib is a continuous structural element that extends circumferentially, forms a solid base, and provides the cage as a whole with the rigidity required to hold the balls of the bearing unit spaced apart equally from one another. On the other hand, the tenons, which are rigidly connected to the cage to contain and retain the balls therebetween, must have substantially elastic behaviour to enable them to open for insertion of the balls and then to close to hold the balls.

These retaining cages are usually used in high-velocity, high-vibration bearing units for use both in the automotive sector, for example in powertrains, and in the industrial sector, for example in machine tool spindles, and are typically made by injection moulding a polymer material, including to compensate for poor lubrication conditions.

The retaining cages made of a known polymer material described above, while in general guaranteeing good performance in many operating conditions, have some drawbacks in that they are often affected by low temperatures, and tend to be damaged or even broken at the base rib as a result of the shape of the inner surface of the pocket that, in the known bearings described above, has a sharp edge along which tension and stress are usually concentrated. Furthermore, during injection moulding of the retaining cages, this sharp edge can also hinder correct material filling, thereby resulting in additional drawbacks relating to production defects that may be difficult to detect, in particular when the polymer material of the retaining cages is a composite plastic material, for example a plastic material containing glass fibres.

SUMMARY

One objective of the present disclosure is to provide a bearing unit provided with a retaining cage that does not have the drawbacks described above.

Consequently, the present disclosure describes a bearing unit provided with a retaining cage having the features set out in the independent claim attached to the present description.

Other preferred and/or particularly advantageous embodiments of the present disclosure are described according to the features set out in the attached dependent claims.

BRIEF DESCRIPTION OF THE DRAWINGS

The present disclosure is described below with reference to the attached drawings, which show non-limiting example embodiments of same, in which.

DETAILED DESCRIPTION

Figure 1:
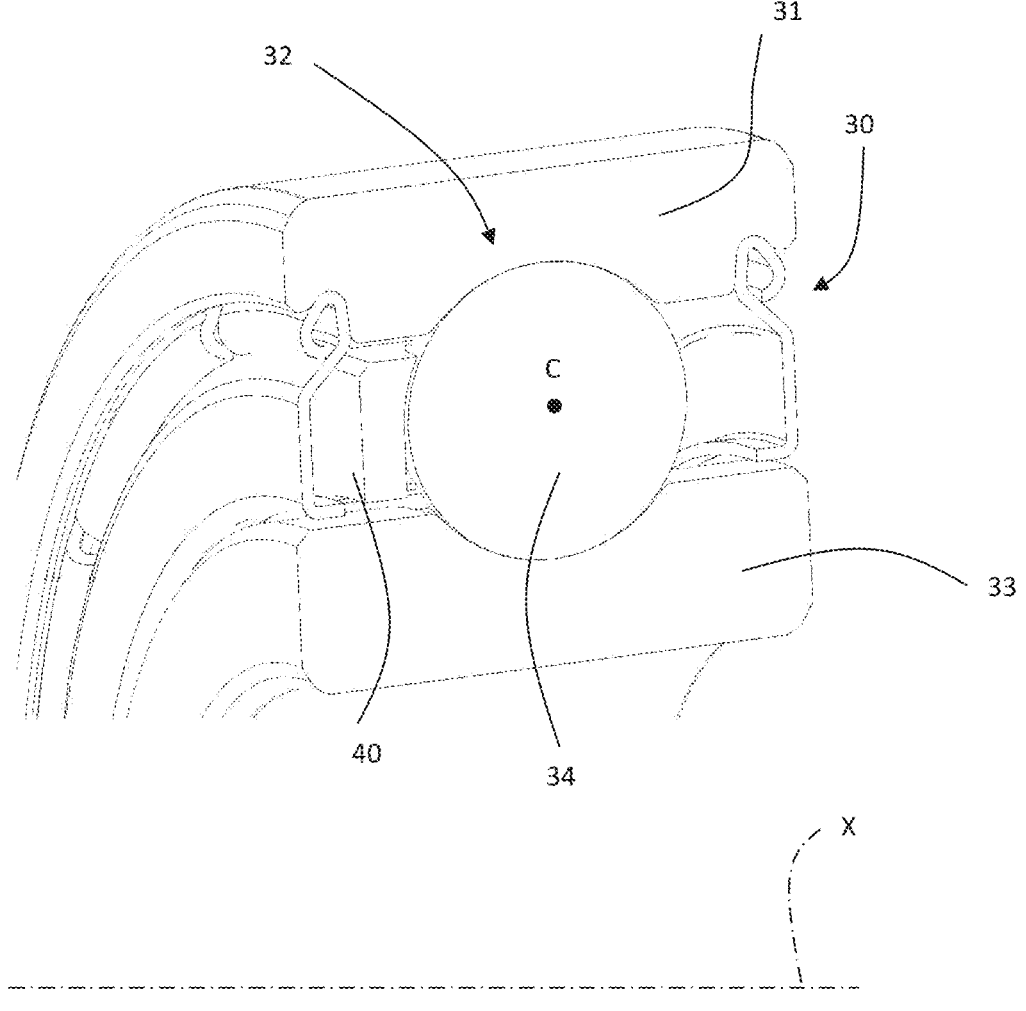
FIG. 1 is a partial cross section of a first preferred embodiment of a bearing unit according to the present disclosure.

FIG. 1, reference sign 30 denotes a bearing unit as a whole, according to a first preferred embodiment of the present disclosure.

The bearing unit 30 has a central axis of rotation X and comprises:

- a radially outer ring 31 that is preferably but not necessarily stationary,
- a radially inner ring 33 that is preferably but not necessarily rotary,
- a row 32 of rolling bodies 34 interposed between the radially outer ring 31 and the radially inner ring 33, and
- a cage 40 for holding the rolling bodies 34 of the row 32 of rolling bodies in position.

Throughout the present description and in the claims, terms and expressions indicating positions and orientations, such as "radial" and "axial", are to be understood with reference to the central axis of rotation X of the bearing unit 30, unless otherwise specified. For the sake of simplicity, the term "ball" shall be used by way of example in the present description and in the attached drawing instead of the more generic term "rolling body", and the same reference signs shall be used.

Figure 2:
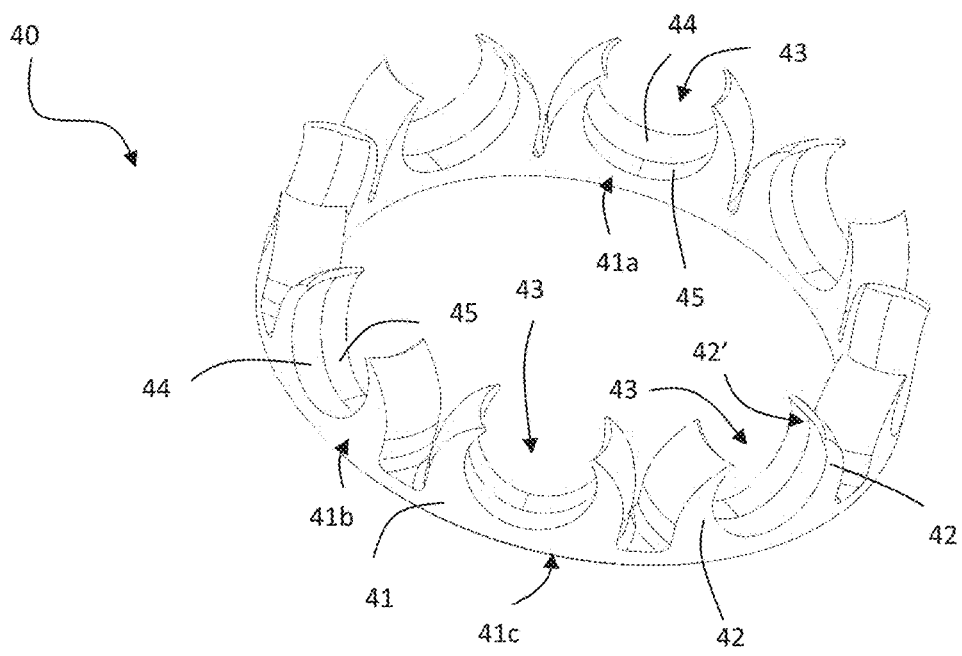
FIG. 2 is an axonometric view of the retaining cage of the bearing unit in FIG. 1.

With reference to FIG. 2, the cage 40 comprises:

- a base rib 41 that is defined by a flattened annular structural element that extends about the axis X and is delimited radially on the inside by a first cylindrical surface 41a, radially on the outside by a second cylindrical surface 41b and axially by an annular surface 41c transverse to the axis X,
- a plurality of arc-shaped tenons 42 spaced apart circumferentially. Two circumferentially adjacent tenons 42 have respective concave surfaces 42' facing one another,
- a plurality of cavities or pockets 43 for holding respective balls. Each pocket 43 is defined by a pair of circumferentially adjacent tenons 42.

Figure 3:
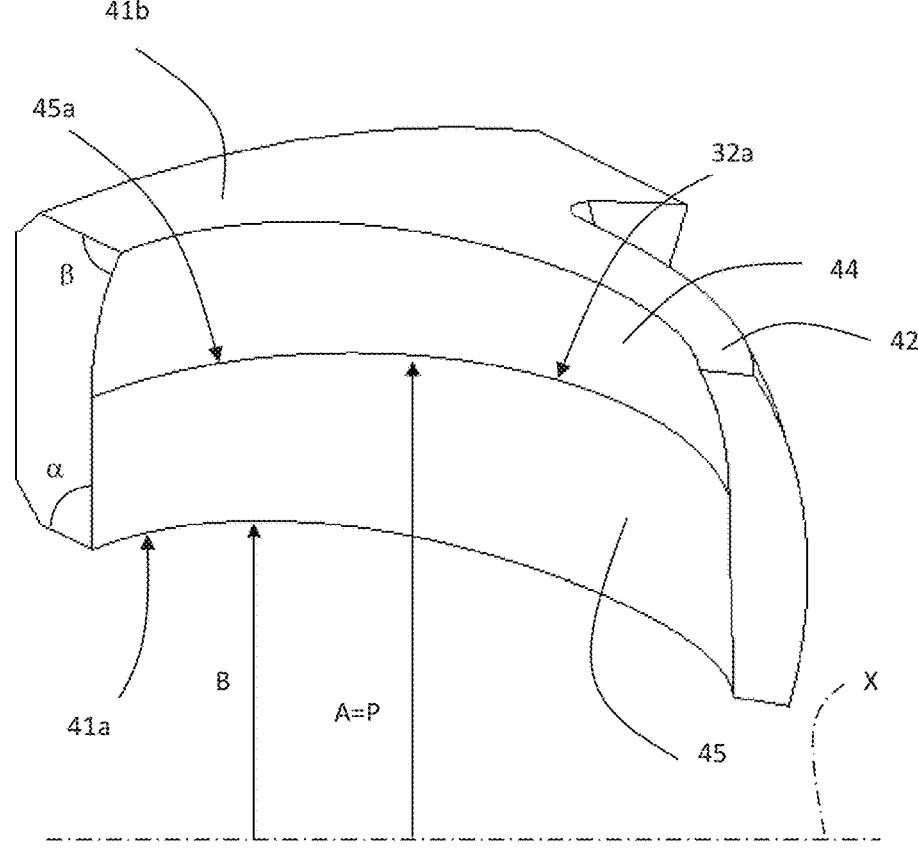
FIG. 3 is a magnified axonometric view of a detail of the retaining cage in FIG. 2.
Figure 4:
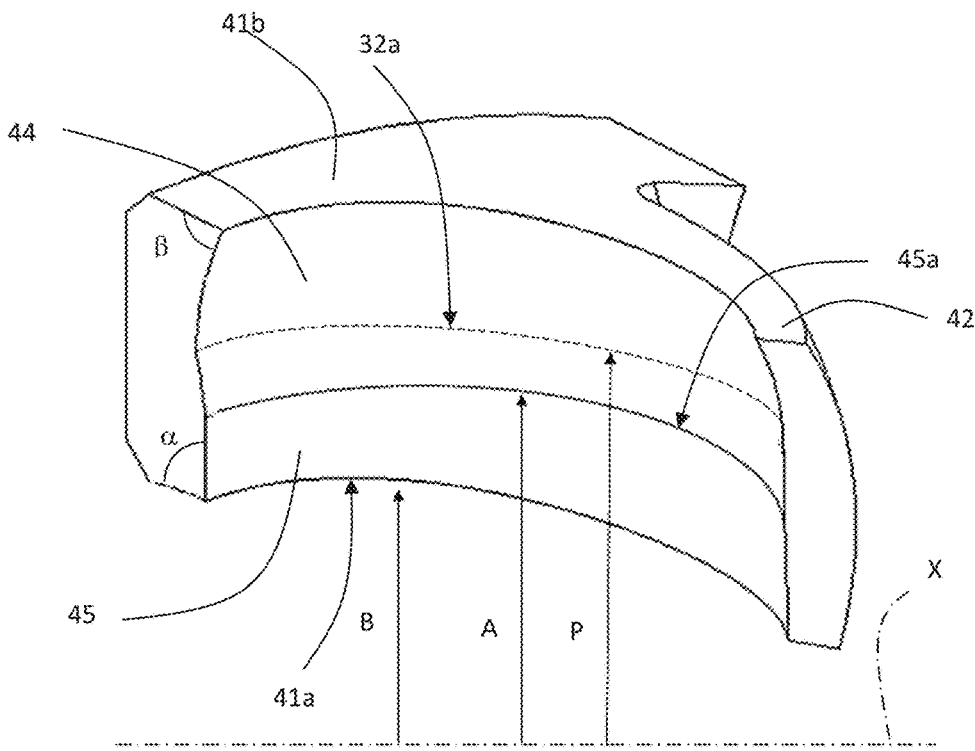
FIG. 4 is a magnified axonometric view of a detail of a second preferred embodiment of a bearing unit according to the present disclosure.
Figure 5:
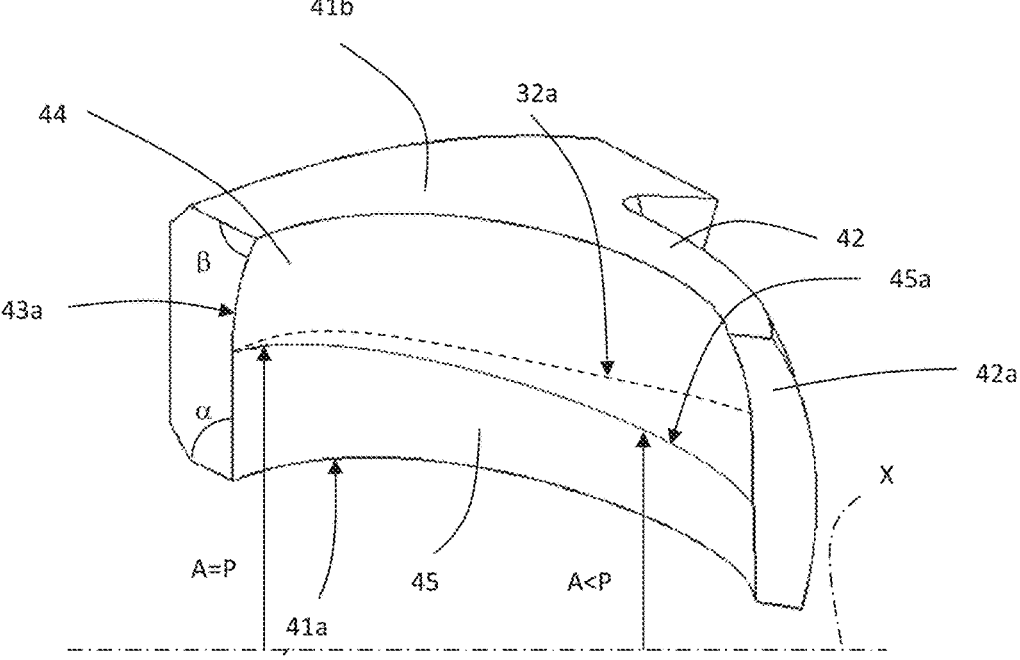
FIG. 5 is a magnified axonometric view of a detail of a third preferred embodiment of a bearing unit according to the present disclosure.

Also with reference to FIGS. 3 to 5, each pocket 43 has at least two surfaces that are radially adjacent to one another:

a radially outer spherical surface 44, and at least one radially inner cylindrical surface 45.

This pocket 43 differs from the spherical pockets in the prior art on account of the simultaneous presence of these surfaces: the spherical surface 44 and the cylindrical surface 45, radially adjacent to one another. This novel shape of the pockets 43, in particular the presence of the cylindrical surface 45, provides various advantages:

reduced stresses in the base rib 41. Indeed, the angle α defined between the cylindrical surface 45 of the pocket 43 and the radially inner first cylindrical surface 41a of the base rib 41 is a right angle or an angle greater than 90°, inclined axially towards the inside of the cylindrical surface 45. In other words, the angle α is an angle greater than the acute angle that, in known cages, is formed between the corresponding radially inner cylindrical surface of the base rib and the spherical surface (single surface) of the pocket. As mentioned above, this acute angle is a starting point for breakages in known polymer cages. On the other hand, the angle α of the cage 40 according to the present disclosure is an angle of at least 90°, and there is therefore more material between the surfaces that define said angle, thereby eliminating or at least significantly reducing the concentration of stresses in that zone.

It should be noted that the spherical surface 44 of the pocket 43 and the radially outer second cylindrical surface 41b of the rib 41 in any case define an acute angle β. However, this acute angle β is usually immaterial in terms of the strength of the cage, since the radially outer zone of the cage is normally less stressed, in particular in terms of centrifugal effects, improvements in the production technology of the cage 40 using injection moulding: the presence of the cylindrical surface 45 and therefore of the angle α equal to or greater than 90° makes it simpler to completely fill the mould of the cage in the zone defined between the cylindrical surface 45 of the pocket 43 and the radially inner cylindrical surface 41a of the base rib 41, guidance and retention of the rolling bodies 34. The presence of the spherical surface 44 in any case guarantees the containment, guidance and retention function of the rolling bodies 34 by the cage 40.

The bearing unit according to the present disclosure may be made according to multiple embodiments that differ from one another in the extension of the cylindrical surface 45 in relation to the total extension of the surface of the pocket 43 of the cage 40.

The applicant has determined that the best solutions are obtained by arranging the spherical surface 44 in the zone radially outside a circumference 32a, defined as the circumference travelled by a centre C of a rolling body 34 during the rotation of the bearing unit, and the cylindrical surface 45 in the zone radially inside the same circumference. Keeping a spherical surface over at least 50% of the total surface of the pocket guarantees better containment of the rolling bodies and of the axial play of the whole cage.

The following is defined on the basis of this design rule:

P: diameter of the circumference 32a travelled by the rolling bodies 34,

A: diameter of an annular boundary surface 45a between the cylindrical surface 45 and the spherical surface 44 of the pocket 43, B: diameter of the radially inner first cylindrical surface 41a of the base rib 41.

A first embodiment is shown in FIG. 3. According to this first embodiment, the cylindrical surface 45 extends radially as far as the circumference 32a travelled by the rolling bodies 34. In other words, the diameter A of the annular surface 45a coincides with the diameter P of the circumference 32a:

$$A = P$$

On account of the foregoing, this first embodiment represents the upper limit of extension of the cylindrical surface 45 of the pocket 43.

A second embodiment is shown in FIG. 4. According to this embodiment, the diameter A of the annular surface 45a is a diameter greater than the diameter B of the radially inner cylindrical surface 41a of the rib 41, according to the following equation:

$$A = B + 0.025 \times B$$

This second embodiment represents the lower limit of extension of the cylindrical surface 45 of the pocket 43. A lesser surface extension would make the benefits related to the presence of the cylindrical surface negligible.

A third embodiment is shown in FIG. 5. According to this embodiment, which can be understood to be an intermediate embodiment between the first two embodiments, the cylindrical surface 45 extends variably in the circumferential direction, not constantly. For example and as shown in the configuration in FIG. 5, following the circumference clockwise from a central edge 43a of the pocket 43 towards an end edge 42a of the tenon 42, the cylindrical surface 45 is initially delimited by a diameter A of the annular surface 45a coincident with the diameter P of the circumference 32a, therefore A=P. Subsequently, moving towards the end edge 42a of the tenon 42, the diameter A decreases (therefore A<P), while however always observing the limit condition of the configuration shown in FIG. 4, specifically:

$$A \geq B + 0.025 \times B$$

A variant of the embodiment described above is the symmetrical embodiment thereof: following the circumference anticlockwise, A=P at the end edge 42a of the tenon 42, and $$B + 0.025 \times B \leq A \leq P$$

at the central edge 43a of the pocket 43.

Figure 6:
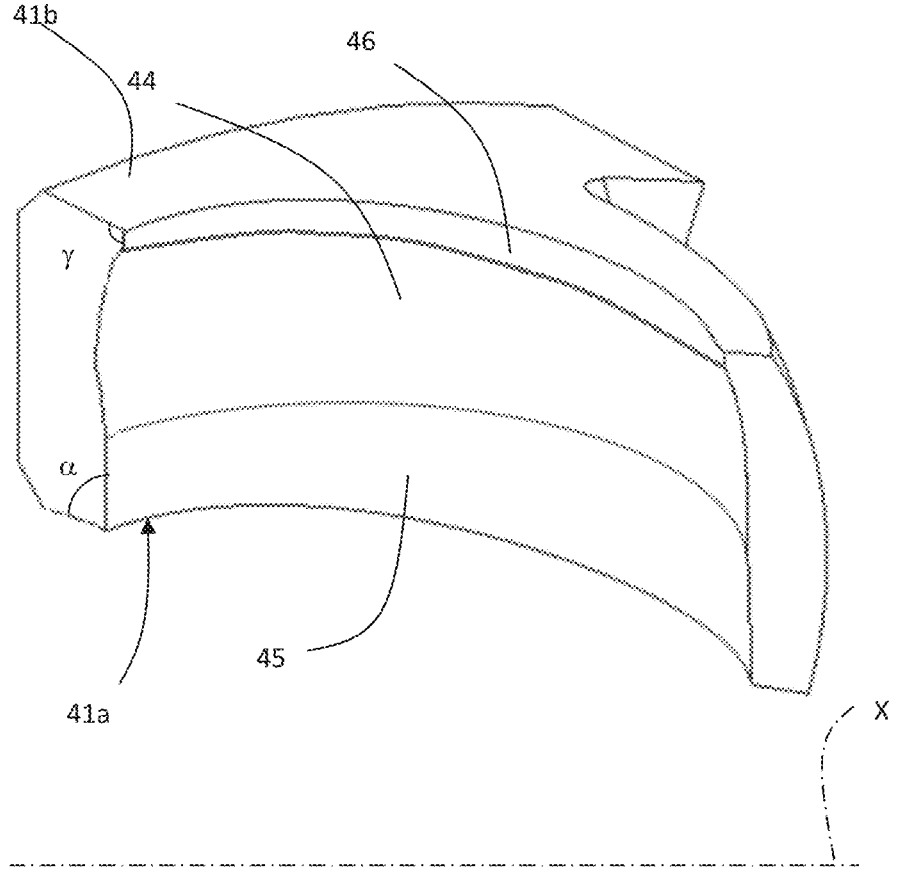
FIG. 6 is a magnified axonometric view of a detail of a fourth preferred embodiment of a bearing unit according to the present disclosure.

With reference to FIG. 6, according to a fourth embodiment, the pocket 43 has three surfaces radially adjacent to one another:

a first radially inner cylindrical surface 45, a radially outer second cylindrical surface 46, and a spherical surface 44 interposed radially between the two cylindrical surfaces 45, 46.

Consequently, according to this embodiment, the pocket 43 comprises three surfaces that are radially contiguous with one another, of which the external surfaces are cylindrical and the intermediate surface is spherical. This embodiment also differs from the prior art according to which the pocket is made with a single spherical surface. For such a cage to guarantee a good containment effect of the rolling bodies, the spherical surface 45 should represent at least 50% of the total surface of the pocket 43.

Evidently, this embodiment of the pocket 43 confers the same advantages as described in relation to the preceding embodiment (FIGS. 3 to 5).

Additionally, it should be noted that the angle γ defined between the second cylindrical surface 46 of the pocket 43 and the radially outer second cylindrical surface 41*b* of the rib 41 is a right angle (or greater than) 90°, as is the angle α that, also according to this embodiment, is formed between the radially inner cylindrical surface 45 of the pocket 43 and the radially inner first cylindrical surface 41*a* of the base rib 41.

In this embodiment, having a right angle γ instead of the acute angle β also helps to reduce the stresses in the radially outer zone of the cage, where specific applications, such as applications with relevant centrifugal effects, mean that this zone is also critical in terms of stress.

Figure 7:
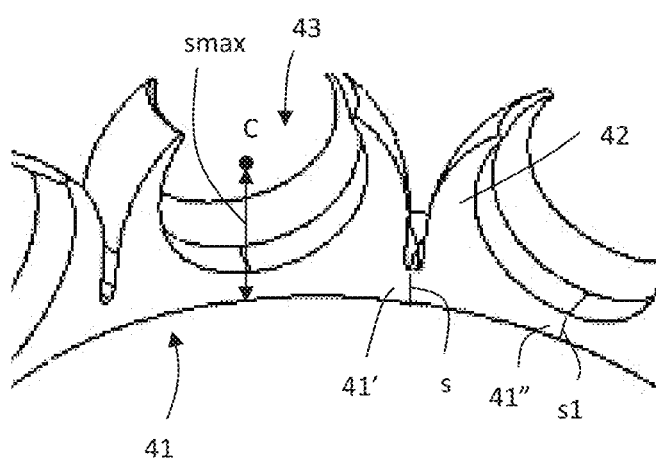
FIG. 7 is a magnified axonometric view of a detail of a fifth preferred embodiment of a bearing unit according to the present disclosure.

With reference to FIG. 7, a fifth embodiment has tenons 42 that are more flexible.

This is obtained, without altering the axial encumbrance of the cage 40, by axially lengthening the tenons 42 and reducing the axial thickness of the base rib 41 accordingly.

The base rib 41 has alternating portions in the circumferential direction: a first portion 41' corresponding to a pair of tenons 42 alternating with a second portion 41" corresponding to a pocket 43. To axially lengthen the tenons 42, the thickness s of the first portion 41' of the base rib 41 is reduced to a minimum limit equal to the thickness s1 of the second portion 41" of the rib 41.

The axial lengthening of the tenons 42 can be understood by bearing in mind that the thickness s of the first portion 41' of the rib 42 is usually greater, up to a maximum value smax substantially equal to the distance between the centre C of a rolling body 34 and the annular surface 41*c* of the rib 41.

This feature makes the tenons 42 more flexible and consequently also the pockets 43. This provides the following advantages:

lower stress levels in the cage 40, and in particular in the rib 41, and greater torsional flexibility of the cage 40 and in particular of the tenons 42, which are more flexible in relation to one another and can better follow the rolling motion of the rolling bodies 34.

Numerous other variants exist in addition to the embodiments of the present disclosure described above. Said embodiments are provided solely by way of example and do not limit the scope of the present disclosure, its applications or its possible configurations. Indeed, although the description provided above enables the person skilled in the art to carry out the present disclosure at least according to one example configuration thereof, numerous variations of the components described could be used without thereby departing from the scope of the present disclosure, as defined in the attached claims interpreted literally and/or according to their legal equivalents.

What is claimed is:

1. A bearing unit having a central rotation axis and comprising:

a radially outer ring;

a radially inner ring;

a row of rolling bodies between the radially outer ring and the radially inner ring; and a retaining cage for retaining the rolling bodies, the retaining cage comprising:

a rib;

a plurality of circumferentially spaced tenons; and a plurality of pockets, each pocket being defined by a pair of tenons that are circumferentially adjacent, each pocket having:

a spherical surface, radially external; and at least one cylindrical surface, radially internal and radially adjacent to the spherical surface;

wherein the cylindrical surface is radially inside a circumference, traversed by a center of a rolling body during rotation of the bearing unit;

wherein the diameter (A) of an annular boundary surface between the cylindrical surface and the spherical surface of the pocket is comprised between the diameter (P) of the circumference and the diameter (B) of the cylindrical surface, radially internal, of the rib by means of the relationship: $B+(0.025\times B)\leq A\leq P$.

2. The bearing unit according to claim 1, wherein the cylindrical surface of the pocket and a radially internal cylindrical surface of the rib define an angle having a value greater than or equal to 90°.

3. The bearing unit according to claim 2, wherein the angle is a right angle.

4. The bearing unit according to claim 1, wherein each pocket of the plurality of pockets has three surfaces radially adjacent to each other, the three surfaces being:

a first cylindrical surface, radially internal;

a second cylindrical surface, radially external; and a spherical surface, radially interposed between the first and second cylindrical surfaces.

5. The bearing unit according to claim 4, wherein the second cylindrical surface of the pocket and a radially outer cylindrical surface of the rib define an angle having a value greater than or equal to 90°.

6. The bearing unit according to claim 4, wherein the spherical surface is equal to at least 50% of the entire surface of the pocket.

7. The bearing unit according claim 6, wherein the rib has alternate portions along the circumferential direction, with a first portion, having a first thickness, located in correspondence of a pair of tenons, and a second portion, having a second thickness, located in correspondence of the pockets and wherein the thickness of the first portion is between the second thickness and the distance between the center of the rolling body and an annular surface of the rib.

8. The bearing unit according to claim 4, wherein the rib has alternate portions along the circumferential direction, with a first portion, having a first thickness, located in correspondence of a pair of tenons, and a second portion, having a second thickness, located in correspondence of the pockets and wherein the thickness of the first portion is between the second thickness and the distance between the center of the rolling body and an annular surface of the rib.

9. A bearing unit having a central rotation axis and comprising:

a radially outer ring;

a radially inner ring;

a row of rolling bodies between the radially outer ring and the radially inner ring; and a retaining cage for retaining the rolling bodies, the retaining cage comprising:

a rib;

a plurality of circumferentially spaced tenons; and a plurality of pockets, each pocket being defined by a pair of tenons that are circumferentially adjacent, each pocket having:

a spherical surface, radially external; and

at least one cylindrical surface, radially internal and
radially adjacent to the spherical surface;
wherein the rib has alternate portions along the circum-
ferential direction, with a first portion, having a first
thickness, located in correspondence of a pair of ten-
ons, and a second portion, having a second thickness,
located in correspondence of the pockets and wherein
the thickness of the first portion is between the second
thickness and the distance between the center of the
rolling body and an annular surface of the rib.

10. The bearing unit according to claim 9, wherein the
cylindrical surface is radially inside a circumference, tra-
versed by a center of a rolling body during rotation of the
bearing unit.

11. The bearing unit according to claim 10, wherein the
cylindrical surface of the pocket and a radially internal
cylindrical surface of the rib define an angle having a value
greater than or equal to 90°.

12. The bearing unit according to claim 11, wherein the
angle is a right angle.

13. The bearing unit according to claim 11, wherein each
pocket of the plurality of pockets has three surfaces radially
adjacent to each other, the three surfaces being:
a first cylindrical surface, radially internal;
a second cylindrical surface, radially external; and
a spherical surface, radially interposed between the first
and second cylindrical surfaces.

14. The bearing unit according to claim 13, wherein the
second cylindrical surface of the pocket and a radially outer
cylindrical surface of the rib define an angle having a value
greater than or equal to 90°.

15. The bearing unit according to claim 13, wherein the
spherical surface is equal to at least 50% of the entire surface
of the pocket.

*     *     *     *     *